United States Patent
Zhang et al.

(10) Patent No.: US 11,943,114 B1
(45) Date of Patent: Mar. 26, 2024

(54) ACTIVE EDGE CACHING METHOD BASED ON COMMUNITY DISCOVERY AND WEIGHTED FEDERATED LEARNING

(71) Applicant: SHANDONG UNIVERSITY, Jinan (CN)

(72) Inventors: Haixia Zhang, Jinan (CN); Dongyang Li, Jinan (CN); Dongfeng Yuan, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/327,574

(22) Filed: Jun. 1, 2023

(30) Foreign Application Priority Data

Oct. 25, 2022 (CN) .......................... 202211310238.5

(51) Int. Cl.
*H04L 41/12* (2022.01)
*H04L 41/16* (2022.01)
*H04W 76/14* (2018.01)

(52) U.S. Cl.
CPC .............. *H04L 41/12* (2013.01); *H04L 41/16* (2013.01); *H04W 76/14* (2018.02)

(58) Field of Classification Search
CPC ......... H04L 41/12; H04L 41/16; H04W 76/14
See application file for complete search history.

(56) References Cited

U.S. PATENT DOCUMENTS

| 2015/0026289 | A1* | 1/2015 | Nordness | H04L 67/1097 |
| | | | | 709/213 |
| 2016/0294971 | A1* | 10/2016 | Li | H04L 47/125 |
| 2021/0144202 | A1* | 5/2021 | Maciocco | H04L 67/306 |

FOREIGN PATENT DOCUMENTS

| CN | 111865826 A | 10/2020 |
| CN | 113315978 A | 8/2021 |
| CN | 114205791 A | 3/2022 |
| CN | 114595632 A | 6/2022 |

\* cited by examiner

*Primary Examiner* — Adnan M Mirza
(74) *Attorney, Agent, or Firm* — CBM PATENT CONSULTING, LLC (57) ABSTRACT

An active edge caching method based on community discovery and weighted federated learning for selecting an optimal caching user and developing an optimal caching strategy; user grouping method based on community discovery is first provided, users are divided into different user groups according to users' mobility and social attributes, degrees of importance of different users are computed in each user group, and most important user is selected as a caching node to provide content distribution services; a content popularity prediction framework based on attention weighted federated learning is provided for combining attention weighted federated learning mechanism with deep learning algorithm to predict future user preferences for different content, so as to improve content popularity prediction accuracy and solve user privacy disclosure; finally, hot content is cached on selected caching users according to prediction results, to achieve goals of reducing network transmission latency and network operation cost.

9 Claims, 6 Drawing Sheets

ACTIVE EDGE CACHING METHOD BASED ON COMMUNITY DISCOVERY AND WEIGHTED FEDERATED LEARNING

CROSS-REFERENCE TO RELATED APPLICATIONS

This application claims priority to Chinese Patent Application Ser. No. CN 2022113102385 filed on 25 Oct. 2022.

FIELD OF THE INVENTION

The present disclosure belongs to the technical fields of wireless communication and artificial intelligence, and specifically relates to an active edge caching method based on community discovery and weighted federated learning, which may be used for intelligent management and planning of caching resources in device-to-device (D2D) assisted wireless communication networks.

BACKGROUND OF THE INVENTION

With the popularization and development of wireless mobile communication and Internet of Things technology, wireless data traffic has shown explosive growth. However, due to limited wireless communication resources, such a rapid growth of data traffic causes congestion of mobile communication networks, which then increases transmission latency of the content requested by the user. The introduction of advanced network transmission technologies is urgently needed to ensure low latency requirements of various novel services. As a new network technology, edge caching may store hot content that users are interested in at the edge of a network in advance, thereby reducing load pressure of a communication link and greatly reducing transmission latency of content.

According to different cache locations, existing edge caching schemes may be divided into base station caching and user caching. Compared with the base station caching, the user caching may store hot content in a terminal closer to a user, and the content may be transmitted through D2D direct communication, thereby further reducing the transmission latency of the content. Therefore, the user caching is considered by the industry and academia as one of the important technical means to ensure the low latency requirements of services.

For the user caching, renting all user terminals as caching nodes reduces the transmission latency of the content, but causes high operation cost. How to optimize the selection of a user terminal as a caching node to achieve a compromise between operation cost and the transmission latency of the content has become one of the key issues to be solved in designing user caching strategies.

Moreover, due to the limited storage capacity of the selected user terminal, it is not feasible to cache all content on the terminal. Future user preferences for different content should be predicted to design corresponding caching strategies. However, current content popularity prediction methods based on centralized learning require sending user's personal data to a central server for model training, causing serious problems of user privacy disclosure. Thus, how to place hot content on the selected user terminal while ensuring user privacy security has become another key issue to be urgently solved.

SUMMARY OF THE INVENTION

In view of the shortcomings of the prior art, the present disclosure provides an active edge caching method based on community discovery and weighted federated learning, which is used for selecting a best caching user and developing an optimal user caching strategy, so as to achieve an optimal compromise between the operation cost and the transmission latency of the content.

The present disclosure first provides a user grouping method based on community discovery, in which users are divided into different user groups according to users' mobility and social attributes, then degrees of importance of different users are computed in each user group, and the most important user is selected as a caching node to provide content distribution services. On this basis, the present disclosure provides a content popularity prediction framework based on attention weighted federated learning, which combines an attention weighted federated learning mechanism with a deep learning (DL) model to predict future user preferences for different content. This framework not only improves accuracy of content popularity prediction, but also solves problems of user privacy disclosure. Finally, an optimal caching strategy is developed based on caching user selection and content popularity prediction to reduce network transmission latency and network operation cost.

BRIEF SUMMARY

The present disclosure provides an active edge caching method based on community discovery and weighted federated learning. Users are aggregated into different user groups in a service scope of a base station by using a community discovery algorithm, and a most important user is selected from each user group as a caching node to provide content distribution services. Considering activity levels of different users and heterogeneity of terminal computing capabilities, a content popularity prediction framework based on attention weighted federated learning is designed to train the DL model. Then, user's content preferences at the next moment are predicted by using the trained DL model to cache hot content on a selected user. The present disclosure caches the hottest content to the optimal selected user, which can greatly reduce network transmission latency and network operation cost.

The technical solution of the present disclosure is as follows:

An active edge caching method based on community discovery and weighted federated learning includes:
- aggregating users into different user groups in a service scope of a base station by using a community discovery algorithm;
- selecting a most important user from each user group as a caching node to provide content distribution services; and
- training a DL model with a content popularity prediction framework based on attention weighted federated learning, and then predicting user's content preferences at the next moment by using the trained DL model to cache hot content on a selected user.

Preferably, an operating system for the active edge caching method includes a base station and U users, where each user has content storage capability and requests content from a content library F=f 1; 2; : : : ; f : : : ; Fg according to personal preferences.

Preferably, the aggregating users into different user groups in a service scope of a base station by using a community discovery algorithm includes:
(1) obtaining physical distances and social relationships between different users; constructing a D2D content sharing graph G=fU; Eg according to the physical distances and social relationships between different users, where U is a user node, E represents whether a D2D communication link has been established between users for content transmission, and E=1 represents that a D2D communication link has been established; that is, when the physical distance between user u and user v in the base station is less than a communication distance threshold and the two users have a social relationship, a D2D communication link has been established between user u and user v for content transmission, and $E_{u;v}=1$; otherwise, $E_{u;v}=0$; and (2) dividing the users into different user groups C=f $C_1$; $C_2$; : : : ; $C_i$; : : : ; $C_i$ g based on the constructed D2D content sharing graph G=fU; Eg.

Preferably, dividing users into different user groups by using a Louvain community discovery algorithm includes:

A. treating each node in the D2D content sharing graph G as an independent community;

B. assigning each node in turn to a community where its neighbor nodes are located, computing a modularity change ΔQ before and after assigning, recording a neighbor node maxΔQ with maximum ΔQ, and assigning the node to a community where the neighbor node with maximum ΔQ is located if maxΔQ>0, otherwise remaining the node unchanged, where ΔQ is computed by formula (I):

$$¢Q_{u!G} = \frac{A_{u;v}+a_{u!G}}{2m} i \frac{^\mu a_G + a(u)^{q_{2}''}}{2m} i \frac{''A_{u;v}}{2m} \frac{^3 a_G^{'2}}{2m} i \frac{^\mu a(u)^{q_{2}^\#}}{2m}; = \frac{a_{u!}G}{2m} i \frac{a_G £a(u)}{2m^2}; \quad (I)$$

where, m=˙ $E_{u;v}$ is a sum of all edge weights in the D2D content sharing graph G; $A_{u;v}=˙ E_{u;v}$; 8u; v 2 $C_i$ is a sum of edge weights between all nodes in community $C_i$; $a_{C_i}$ represents a sum of weights of connecting edges between community $C_i$ and other communities; $a_{u!C_i}$ is a sum of edge weights between all nodes after node U is moved into community $C_i$; a(u) is a sum of weights of all edges connected to node U;

C. repeating step B until the communities of all nodes do not change;

D. compressing the nodes in the same community into a new node to convert the edge weights between nodes within the community into an edge weight of the new node and convert the edge weights between communities into edge weights between new nodes; and E. repeating steps A-D until the modularity of the entire D2D content sharing graph G does not change.

Preferably, the selecting a most important user from each user group as a caching node to provide content distribution services includes:

(3) in each user group, first computing a centrality $B_u$ of each user, where $B_u$ is computed by formula (II):

$$B_u = X_{i=1}^U X_{i<j} \frac{g_{i;j}(u)}{G_{i;j}} \quad (II)$$

where, $G_{i;j}$ represents the number of shortest path links between all users in the D2D content sharing graph, and $g_{i;j}(u)$ is the number of links that pass through user u in $G_{i;j}$;

then obtaining caching capacities $S_u$ of different users according to the storage capacities of different user devices;

finally, computing degrees of importance $V_u=° £ B_u + (1_i°)£ S_u$ of different users in different user groups according to the centralities $B_u$ and the caching capacities $S_u$, where ˇ is a weight assigned to the centralities $B_u$ and the caching capacities $S_u$, with a value between 0 and 1;

(4) sorting the users in different user groups according to the degrees of importance $V_u$, and selecting the most important user as the user caching node in each user group; and (5) after the caching nodes are selected, selecting hot content according to the popularity of different content in the user groups for caching on the selected users.

Preferably, the training a content popularity deep learning prediction model, namely, DL model with an attention weighted federated learning framework includes:

(6) selecting user terminals to participate in the training process of content popularity deep learning prediction model, and training the content popularity deep learning prediction model with locally recorded user's historical content request data; after the content popularity deep learning prediction model is trained on different user terminals, transmitting the models to a base station for model aggregation; and (7) in the process of model aggregation, assigning, by the base station, different weights to the content popularity deep learning prediction models, namely, local models of different user terminals according to user activities and terminal computing capabilities, where the weights are computed by formulas (III) and (IV):

$$a_{r+1}^u = \frac{°d_{r_{oj\frac{1}{2}r}}^u °}{P_{u=1}^U °d_{r_i\frac{1}{2}r}^u °} \quad (III)$$

$$q_{r+1}^u = \frac{\log(e_{r+1}^u)}{\log(\max feg)} \quad (IV)$$

where, $a_{r+1}{}^u$ represents an activity of the selected user terminal U in the $(r+1)^{th}$ federated training process, $$°d_{r_i\frac{1}{2}r}^U °$$

represents a quantity of requests for different content by the selected terminal U between time windows [$r_i$ 1/2r]; $q_{r+1}{}^u$ represents a computing capability of the selected user terminal U in the $(r+1)^{th}$ federated training process, $e_{r+1}{}^U$ represents the number of local training times that the computing capability of the selected terminal U may be performed in the $(r+1)^{th}$ federated process, log( ) is logarithmic computation, and maxf eg is the maximum number of local training times;

after the weight computation is completed, performing weighted aggregation on different local models to obtain a global content popularity deep learning prediction model, where weighted aggregation formulas are shown as formulas (V) and (VI):

$$w_{r+1}{}^g =_{u=1}{}^{X^U} a_{r+1}{}^u q_{r+1}{}^u w_{r+1}{}^u \quad (V)$$

$$b_{r+1}{}^g =_{u=1}{}^{X^U} a_{r+1}{}^u q_{r+1}{}^u b_{r+1}{}^u \quad (VI)$$

where, $w_{r+1}{}^g$ and $b_{r+1}{}^g$ are a weight and a bias parameter of the content popularity deep learning prediction model after aggregation in the base station; $w_{r+1}{}^u$ and $b_{r+1}{}^u$ are a weight and a bias parameter of the local model obtained on the selected user terminal U after local training; $a_{r+1}{}^u$ and $q_{r+1}1^u$ are weights, computed by formulas (III) and (IV), of the local model trained by the user terminal U.

Preferably, the caching user selected in step (4) uses the obtained content popularity deep learning prediction model to predict user preferences for different content at the next moment to cache hot content, including:

(8) in different user groups, inputting, by the caching users selected in step (4), locally recorded request data $d_{ri}$ $_{1/2r}{}^u$ for different content in the previous 1/: time windows into the trained content popularity deep learning prediction model, and outputting user preferences $\hat{Y}_{r+1}$ for different content at the next moment; subsequently, computing caching probabilities of different content in the selected caching users according to predicted results, as shown in formula (VII):

$$p_{r+1}^f = \frac{\hat{Y}_{r+1}^f}{P_{f=1}^F \hat{Y}_{r+1}^f} \quad \text{(VII)}$$

where, $p_{r+1}{}^f$ represents a probability that content f is cached at the next moment, $\hat{Y}_{r+1}{}^f$ represents a user preference for the content f at the next moment, and $$\Gamma_{f=1}^F \hat{Y}_{r+1}^f$$

represents a sum of user preferences for all content; and (9) sorting the caching probabilities by using a sorting algorithm, and selecting the first S pieces of content with the highest probability for caching at the selected user terminals.

Preferably, the content popularity deep learning prediction model is a bidirectional long short-term memory network model.

A computer device includes a memory and a processor, the memory stores a computer program, and the processor implements the steps of the active edge caching method based on community discovery and weighted federated learning when executing the computer program.

A computer-readable storage medium stores a computer program, and the computer program implements the steps of the active edge caching method based on community discovery and weighted federated learning when executed by a processor.

Beneficial Effects of the Present Disclosure are as Follows:

By selecting an optimal caching user and formulating an optimal user caching strategy, network transmission latency can be greatly reduced and network operation cost can be reduced. Meanwhile, a weighted federated learning framework is used for content popularity prediction to effectively solve problems of user privacy disclosure. The present disclosure may be applied to intelligent management and planning of storage resources in communication scenarios of cellular networks, Internet of vehicles, industrial Internet, and the like to meet low latency communication requirements of various novel service applications in different vertical fields.

DETAILED DESCRIPTION OF THE EMBODIMENTS

The present disclosure is further defined by, but not limited to, the accompanying drawings and embodiments of the specification.

Embodiment 1

An active edge caching method based on community discovery and weighted federated learning includes:
aggregating users into different user groups in a service scope of a base station by using a community discovery algorithm;
selecting a most important user from each user group as a caching node to provide content distribution services; and
training a DL model with a content popularity prediction framework based on attention weighted federated learning, and then predicting user's content preferences at the next moment by using the trained DL model to cache hot content on a selected user.

Embodiment 2

Figure 1:
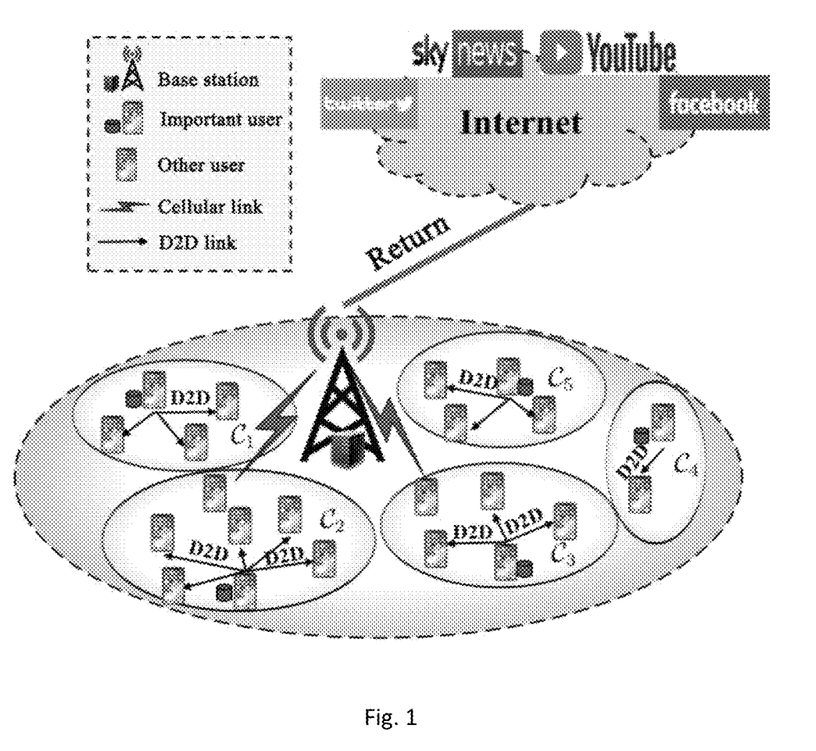
FIG. 1 is a block diagram of an operating system for an active edge caching method according to the present disclosure.

According to the active edge caching method based on community discovery and weighted federated learning described in Embodiment 1, differences are as follows:

As shown in FIG. 1, an operating system for the active edge caching method includes a base station and U users, where each user has content storage capability and requests content from a content library F=f 1; 2; : : : ; f : : : ; Fg according to personal preferences. In order to avoid network congestion caused by repeated content downloading requests and reduce content downloading latency, operators rent some user terminals as caching nodes to provide caching services. In order to select a best caching user and place best hot content, the present disclosure provides an active edge caching method to reduce network transmission latency and network operation cost.

Figure 2:
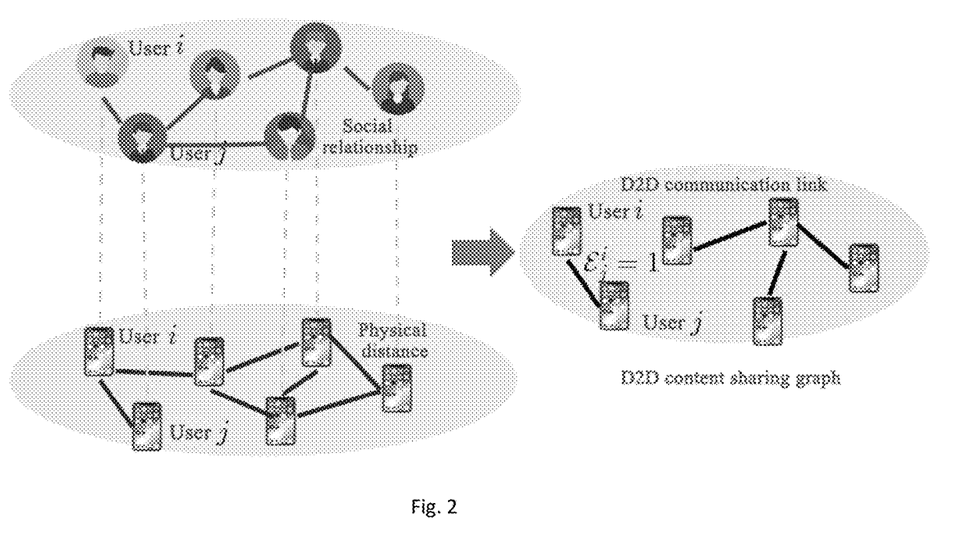
FIG. 2 is a schematic flowchart of constructing a D2D content sharing graph according to the present disclosure.

The aggregating users into different user groups in a service scope of a base station by using a community discovery algorithm includes:

(1) obtaining physical distances between different users by means of GPS or the like, and simultaneously obtaining social relationships between different users from social platforms such as microblog, WeChat, and Tik Tok; constructing a D2D content sharing graph G=f U; Eg according to the physical distances and social relationships between different users, where U is a user node, E represents whether a D2D communication link has been established between users for content transmission, and E=1 represents that a D2D communication link has been established; where a specific construction flow is shown as FIG. 2, that is, when the physical distance between user u and user v in the base station is less than a communication distance threshold (the communication distance threshold is generally determined by transmitting power of a user terminal, and the higher transmitting power indicates a longer transmission distance) and the two users have a social relationship, namely, two users keep in touch or are in the same social circle, a D2D communication link has been established between user u and user v for content transmission, and $E_{u; v}=1$; otherwise, $E_{u; v}=0$; and (2) dividing the users into different user groups C=f $C_1$; $C_2$; : : : : ; $C_i$; : : : : ; $C_i$ g based on the constructed D2D content sharing graph G=f U; Eg by using a Louvain community discovery algorithm. The method used for user grouping in the present disclosure is not limited to the Louvain algorithm, but may alternatively be graph segmentation algorithms such as Kernighan-Lin, and Newman and Girvan.

Figure 3:
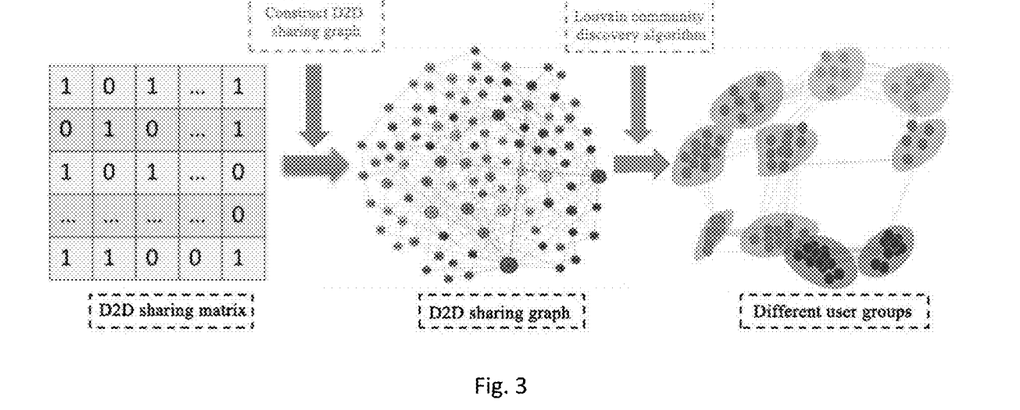
FIG. 3 is a schematic flowchart of grouping users using a Louvain community discovery algorithm according to the present disclosure.

The dividing the users into different user groups by using a Louvain community discovery algorithm, as shown in FIG. 3, includes:

A. treating each node in the D2D content sharing graph G as an independent community;

B. assigning each node in turn to a community where its neighbor nodes are located, computing a modularity change $\Delta Q$ before and after assigning, recording a neighbor node max$\Delta Q$ with maximum $\Delta Q$, and assigning the node to a community where the neighbor node with maximum $\Delta Q$ is located if max$\Delta Q>0$, otherwise remaining the node unchanged, where $\Delta Q$ is computed by formula (I):

$$cQ_{u!G} = \frac{A_{u;v} + a_{u!G}}{2m} i \frac{\mu_{a_G} + a(u)^{q_{2''}}}{2m} i \frac{''A_{u;v}}{2m} i \frac{^3 a_G'^2}{2m} i \frac{\mu_{a(u)}{q^{\#}_{12}}}{2m}; = \frac{a_{u!G}}{2m} i \frac{a_G £ a(u)}{2m^2};$$

where, m=˙ $E_{u; v}$ is a sum of all edge weights in the D2D content sharing graph G; $A_{u; v}$=˙ $E_{u; v}$; 8u ; v 2 $C_i$ is a sum of edge weights between all nodes in community $C_i$; $a_{C_i}$ represents a sum of weights of connecting edges between community $C_i$ and other communities; $a_{u! C_i}$ is a sum of edge weights between all nodes after node U is moved into community $C_i$; a(u) is a sum of weights of all edges connected to node U;

C. repeating step B until the communities of all nodes do not change;

D. compressing the nodes in the same community into a new node to convert the edge weights between nodes within the community into an edge weight of the new node and convert the edge weights between communities into edge weights between new nodes; and E. repeating steps A-D until the modularity of the entire D2D content sharing graph G does not change.

The selecting a most important user from each user group as a caching node to provide content distribution services includes:

(3) in each user group, first computing a centrality $B_u$ of each user, where $B_u$ is computed by formula (II):

$$B_u = X_{i=1}^{U} X_{i<j} \frac{g_{i;j}(u)}{G_{i;j}} \quad (II)$$

where, $G_{i; j}$ represents the number of shortest path links between all users in the D2D content sharing graph, and $g_{i; j}$ (u) is the number of links that pass through user U in $G_{i; j}$;

then obtaining caching capacities $S_u$ of different users according to the storage capacities of different user devices, where the caching capacities $S_u$ are magnitudes of inherent storage spaces of terminals such as users' mobile phones;

finally, computing degrees of importance $V_u=°$ £ $B_u$+ $(1_i°)£$ $S_u$ of different users in different user groups according to the centralities $B_u$ and the caching capacities $S_u$, where ˇ is a weight assigned to the centralities $B_u$ and the caching capacities $S_u$, with a value between 0 and 1;

(4) sorting the users in different user groups according to the degrees of importance $V_u$, and selecting the most important user as the user caching node in each user group; and (5) after the caching nodes are selected, selecting hot content according to the popularity of different content in the user groups for caching on the selected users.

Figure 4:
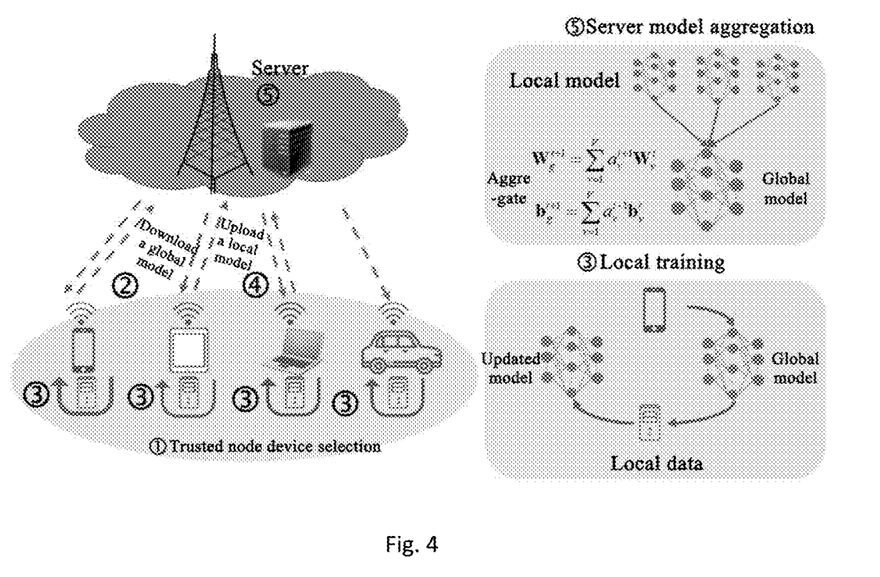
FIG. 4 is a schematic diagram of a content popularity prediction model trained based on a weighted federated learning framework according to the present disclosure.
Figure 5:
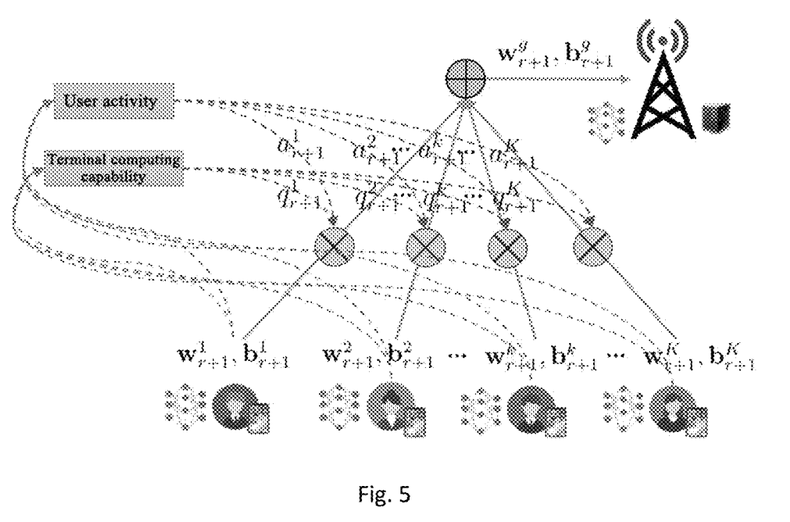
FIG. 5 is a schematic flowchart of weighted aggregation of different local models at a base station according to the present disclosure.

The popularity of different content in different user groups will be predicted through deep learning models. In the present disclosure, the training a content popularity deep learning prediction model, namely, DL model with an attention weighted federated learning framework includes:

(6) selecting a certain proportion of user terminals to participate in the training process of the content popularity deep learning prediction model, where the number of the selected user terminals is determined by the current communication environment, and more user terminals may be selected to participate in federated training when communication resources are relatively idle; training the content popularity deep learning prediction model with locally recorded user's historical content request data; after the content popularity deep learning prediction model is trained on different user terminals, transmitting the models to a base station for model aggregation, where the entire process is shown in FIG. 4; and (7) in the process of model aggregation, assigning, by the base station, different weights to the content popularity deep learning prediction models, namely, local models of different user terminals according to user activities and terminal computing capabilities (as shown in FIG. 5), where the weights are computed by formulas (III) and (IV):

$$a_{r+1}^u = \frac{°d_{r_{oj}\frac{1}{2}r}^u°}{P_{u=1}^U °d_{r_i\frac{1}{2}r}^u°} \quad \text{(III)}$$

$$q_{r+1}^u = \frac{\log(e_{r+1}^u)}{\log(\max feg)} \quad \text{(IV)}$$

where, $a_{r+1}^u$ represents an activity of the selected user terminal U in the $(r+1)^{th}$ federated training process, $$°d_{r_i\frac{1}{2}r}^u°$$

represents a quantity of requests for different content by the selected terminal U between time windows $[r\ i\ 1/\dot{2}\ r]$; $g_{r+1}^u$ represents a computing capability of the selected user terminal U in the $(r+1)^{th}$ federated training process, $e_{r+1}^u$ represents the number of local training times that the computing capability of the selected terminal U may be performed in the $(r+1)^{th}$ federated process, log( ) is logarithmic computation, and maxf eg is the maximum number of local training times;

after the weight computation is completed, performing weighted aggregation on different local models to obtain a global content popularity deep learning prediction model, where weighted aggregation formulas are shown as formulas (V) and (VI):

$$w_{r+1}^g = \sum_{u=1}^{X^U} a_{r+1}^u q_{r+1}^u w_{r+1}^u \quad \text{(V)}$$

$$b_{r+1}^g = \sum_{u=1}^{X^U} a_{r+1}^u q_{r+1}^u b_{r+1}^u \quad \text{(VI)}$$

where, $w_{r+1}^g$ and $b_{r+1}^g$ are a weight and a bias parameter of the content popularity deep learning prediction model after aggregation in the base station; $w_{r+1}^u$ and $b_{r+1}^u$ are a weight and a bias parameter of the local model obtained on the selected user terminal U after local training; $a_{r+1}^u$ and $q_{r+1}^u$ are weights, computed by formulas (III) and (IV), of the local model trained by the user terminal U.

After the content popularity deep learning prediction model is trained with the foregoing weighted federated framework, the caching user selected in step (4) uses the obtained content popularity deep learning prediction model to predict user preferences for different content at the next moment to cache hot content, including:

(8) in different user groups, inputting, by the caching users selected in step (4), locally recorded request data $d_{r_i\ 1/\dot{2}r}^u$ for different content in the previous $1/$: time windows into the trained content popularity deep learning prediction model, and outputting user preferences $\hat{Y}_{r+1}$ for different content at the next moment; subsequently, computing caching probabilities of different content in the selected caching users according to predicted results, as shown in formula (VII):

$$p_{r+1}^f = \frac{\hat{Y}_{r+1}^f}{P_{f=1}^F \hat{Y}_{r+1}^f} \quad \text{(VII)}$$

where, $p_{r+1}^f$ represents a probability that content f is cached at the next moment, $\hat{Y}_{r+1}^f$ represents a user preference for the content f at the next moment, and $$\Gamma_{f=1}^F \hat{Y}_{r+1}^f$$

represents a sum of user preferences for all content; and (9) after the caching probabilities of different content in the selected caching users are computed, sorting the caching probabilities by using a sorting algorithm, and selecting the first S (S is the number of content that may be stored by the selected caching users) pieces of content with the highest probability for caching at the selected user terminals, so as to reduce network transmission latency and network operation cost.

Figure 6:
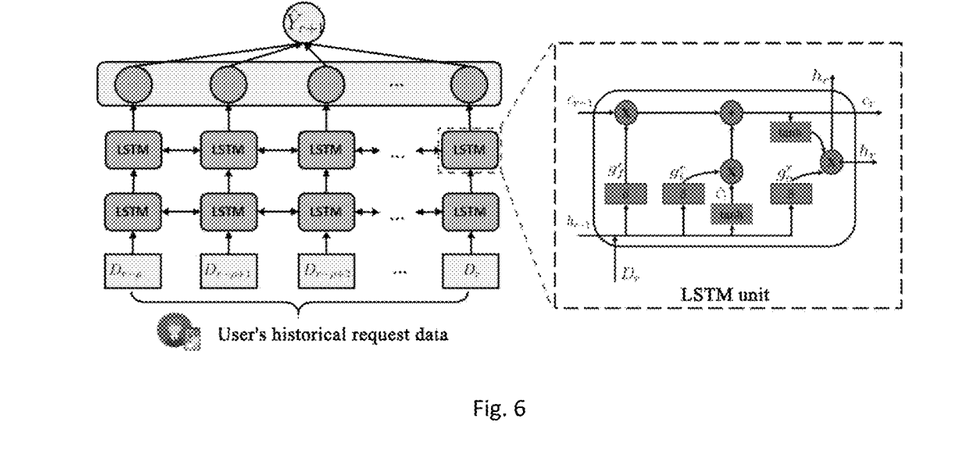
FIG. 6 is a block diagram of a BiLSTM-based content popularity deep learning prediction model used in the present disclosure.

The content popularity deep learning prediction model used in the present disclosure is a bidirectional long short-term memory (BiLSTM) network model, with a structure shown in FIG. 6. The prediction model is not limited to the use of a bidirectional long and short-term memory network, but may be a deep learning network model such as a convolutional neural network model or a graph neural network model.

Figure 7:
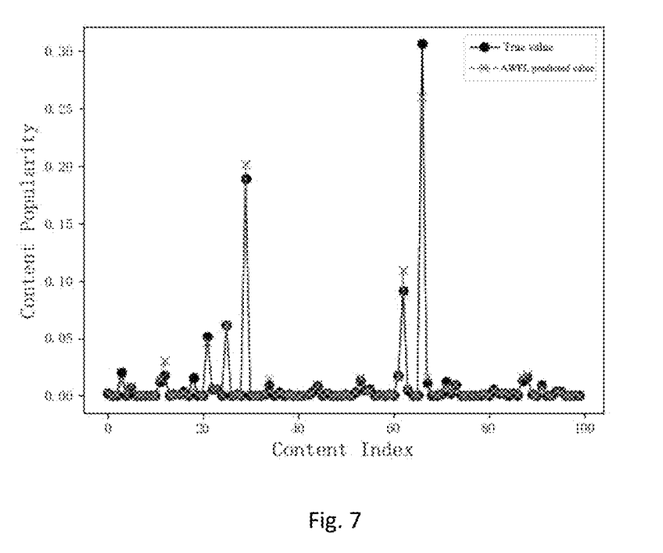
FIG. 7 is a performance analysis diagram of a content popularity deep learning prediction model based on a weighted federated learning framework according to the present disclosure.

FIG. 7 is a performance analysis diagram of the content popularity deep learning prediction model based on a weighted federated learning framework in this embodiment, where horizontal coordinates represent indexes of different request content, and vertical coordinates represent the number of times the user has requested different content. In FIG. 7, AWFL is a predicted value of the content popularity model based on a weighted federated learning framework, and Group True is a true value. It may be seen that the AWFL method of the present disclosure can accurately predict user's future requests for different content. The combination method of weighted federated learning and a bidirectional long short-term memory network, provided in this embodiment, can well fit user's preferences for different content.

Figure 8A:
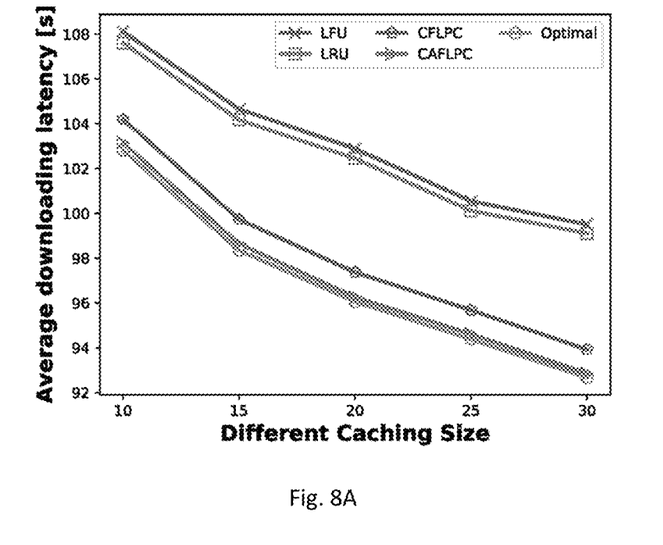
FIG. 8A is a latency performance analysis diagram of an active edge caching method based on community discovery and weighted federated learning according to the present disclosure under different caching capabilities.

FIG. 8(a) is a latency performance analysis diagram of the active edge caching method based on community discovery and weighted federated learning in this embodiment under different caching capabilities, where horizontal coordinates represent quantities of content that may be cached by different user terminals, vertical coordinates represent content downloading latency, and CAFLPC is the active edge caching method based on community discovery and weighted federated learning provided in the present disclosure. FIG. 8(a) can demonstrate that the provided CAFLPC method can well reduce content downloading latency and obtain approximately optimal policy performance under different caching capabilities compared with other methods.

Figure 8B:
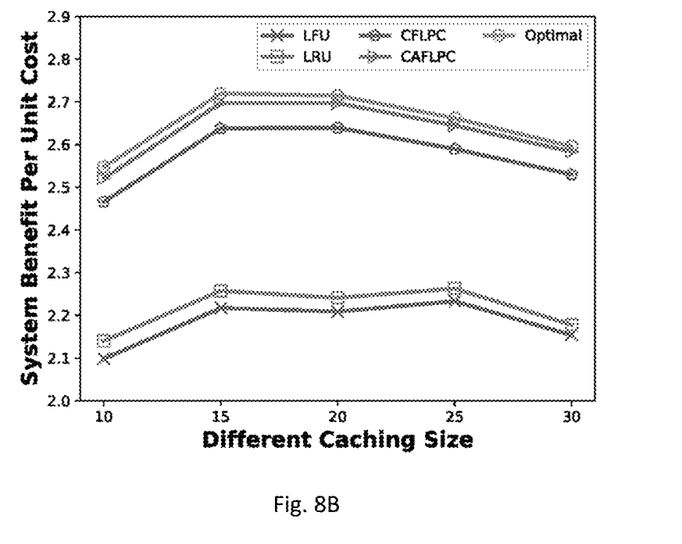
FIG. 8B is an analysis diagram of system benefit per unit cost of an active edge caching method based on community discovery and weighted federated learning according to the present disclosure under different caching capabilities.

FIG. 8(b) is an analysis diagram of system benefit per unit cost of the active edge caching method based on community discovery and weighted federated learning in this embodiment under different caching capabilities. Horizontal coordinates represent quantities of content that may be cached by different user terminals, and vertical coordinates represent system benefit per unit cost. FIG. 8(b) can prove that the provided CAFLPC method can reduce more content downloading latency per unit cost compared with other methods, that is, the provided method can achieve goals of reducing network transmission latency and network operation cost.

Embodiment 3

A computer device includes a memory and a processor, the memory stores a computer program, and the processor implements the steps of the active edge caching method based on community discovery and weighted federated learning when executing the computer program.

Embodiment 4

A computer-readable storage medium stores a computer program, and the computer program implements the steps of the active edge caching method based on community discovery and weighted federated learning when executed by a processor.

What is claimed is:

1. An active edge caching method based on community discovery and weighted federated learning, comprising:
   aggregating users into different user groups in a service scope of a base station by using a community discovery algorithm;
   selecting a most important user from each user group as a caching node to provide content distribution services; and
   training a DL model with a content popularity prediction framework based on attention weighted federated learning, and then predicting user's content preferences at the next moment by using the trained DL model to cache hot content on a selected user;
   wherein the aggregating users into different user groups in a service scope of a base station by using a community discovery algorithm comprises:
   (i) obtaining physical distances and social relationships between different users; constructing a device-to-device (D2D) content sharing graph g={u, ε} according to the physical distances and social relationships between different users, wherein u is a user node, ε represents whether a D2D communication link has been established between users for content transmission, and ε=1 represents that a D2D communication link has been established; that is, when the physical distance between user u and user v in the base station is less than a communication distance threshold and the two users have a social relationship, a D2D communication link has been established between user u and user v for content transmission, and $\varepsilon_{u,v}=1$; otherwise, $\varepsilon_{u,v}=0$; and
   (ii) dividing the users into different user groups C={$C_1$, $C_2$, ..., $C_i$, ..., $C_j$} based on the constructed D2D content sharing graph g={u, ε}.

2. The active edge caching method based on community discovery and weighted federated learning according to claim 1, wherein an operating system for the active edge caching method comprises a base station and U users, wherein each user has content storage capability and requests content from a content library F={1, 2, f, ..., F} according to personal preferences.

3. The active edge caching method based on community discovery and weighted federated learning according to claim 1, wherein dividing users into different user groups by using a Louvain community discovery algorithm comprises:
   A. treating each node in the D2D content sharing graph g as an independent community;
   B. assigning each node in turn to a community where its neighbor nodes are located, computing a modularity change ΔQ before and after assigning, recording a neighbor node maxΔQ with maximum ΔQ, and assigning the node to a community where the neighbor node with maximum ΔQ is located if maxΔQ>0, otherwise remaining the node unchanged, wherein ΔQ is computed by formula (I):

$$\Delta Q_{u \to C_i} = \left[ \frac{A_{u,v} + a_{u \to C_i}}{2m} - \left( \frac{a_{C_i} + a(u)}{2m} \right)^2 \right], \quad (I)$$

$$-\left[ \frac{A_{u,v}}{2m} - \left( \frac{a_{C_i}}{2m} \right)^2 - \left( \frac{a(u)}{2m} \right)^2 \right],$$

$$= \frac{a_{u \to C_i}}{2m} - \frac{a_{C_i} \times a(u)}{2m^2}$$

wherein, $m = \Sigma \varepsilon_{u,v}$ is a sum of all edge weights in the D2D content sharing graph g; $A_{u,v} = \Sigma c E_{u,v}$, $\forall u, v \in C_i$ is a sum of edge weights between all nodes in community $C_i$; $a_{C_i}$ represents a sum of weights of connecting edges between community $C_i$ and other communities; $a_{u \to C_i}$ is a sum of edge weights between all nodes after node u is moved into community $C_i$; a(u) is a sum of weights of all edges connected to node u;
   C. repeating step B until the communities of all nodes do not change;
   D. compressing the nodes in the same community into a new node to convert the edge weights between nodes within the community into an edge weight of the new node and convert the edge weights between communities into edge weights between new nodes; and
   E. repeating steps A-D until the modularity of the entire D2D content sharing graph g does not change.

4. The active edge caching method based on community discovery and weighted federated learning according to claim 1, wherein the selecting a most important user from each user group as a caching node to provide content distribution services comprises:
   (iii) in each user group, first computing a centrality $B_u$ of each user, where $B_u$ is computed by formula (II):

$$B_u = \sum_{i=1}^{U} \sum_{i<j} \frac{g_{i,j}(u)}{G_{i,j}} \quad (II)$$

where, $G_{i,j}$ represents the number of shortest path links between all users in the D2D content sharing graph, and $g_{i,j}(u)$ is the number of links that pass through user u in $G_{i,j}$;
   then obtaining caching capacities $S_u$ of different users according to the storage capacities of different user devices, where the caching capacities $S_u$ are magnitudes of inherent storage spaces of terminals such as users' mobile phones;
   finally, computing degrees of importance $V_u = \gamma \times B_u + (1-\gamma) \times S_u$ of different users in different user groups according to the centralities $B_u$ and the caching capacities $S_u$, where γ is a weight assigned to the centralities $B_u$ and the caching capacities $S_u$, with a value between 0 and 1;
   (iv) sorting the users in different user groups according to the degrees of importance $V_u$, and selecting the most important user as the user caching node in each user group; and
   (v) after the caching nodes are selected, selecting hot content according to the popularity of different content in the user groups for caching on the selected users.

5. The active edge caching method based on community discovery and weighted federated learning according to claim 1, wherein training a content popularity deep learning prediction model, namely, DL model with an attention weighted federated learning framework comprises:

(vi) selecting user terminals to participate in the training process of content popularity deep learning prediction model, and training the content popularity deep learning prediction model with locally recorded user's historical content request data; after the content popularity deep learning prediction model is trained on different user terminals, transmitting the models to a base station for model aggregation; and (vii) in the process of model aggregation, assigning, by the base station, different weights to the content popularity deep learning prediction models, namely, local models of different user terminals according to user activities and terminal computing capabilities, wherein the weights are computed by formulas (III) and (IV):

$$a_{r+1}^u = \frac{|d_{r-\rho:r}^u|}{\sum_{u=1}^{U}|d_{r-\rho:r}^u|} \quad \text{(III)}$$

$$q_{r+1}^u = \frac{\log\{(e_{r+1}^u)\}}{\log(\max\{e\})} \quad \text{(IV)}$$

wherein, $a_{r+1}^u$ represents an activity of the selected user terminal u in the $(r+1)^{th}$ federated training process, $|d_{r-\rho:r}^u|$ represents a quantity of requests for different content by the selected terminal u between time windows $[r-\rho, r]$; $q_{r+1}^u$ represents a computing capability of the selected user terminal u in the $(r+1)^{th}$ federated training process, $e_{r+1}^u$ represents the number of local training times that the computing capability of the selected terminal U may be performed in the $(r+1)^{th}$ federated process, log( ) is logarithmic computation, and max{e} is the maximum number of local training times;

after the weight computation is completed, performing weighted aggregation on different local models to obtain a global content popularity deep learning prediction model, where weighted aggregation formulas are shown as formulas (V) and (VI):

$$w_{r+1}^g = \sum_{u=1}^{U} a_{r+1}^u q_{r+1}^u w_{r+1}^u \quad \text{(V)}$$

$$b_{r+1}^g = \sum_{u=1}^{U} a_{r+1}^u q_{r+1}^u b_{r+1}^u \quad \text{(VI)}$$

wherein, $w_{r+1}^g$ and $b_{r+1}^g$ are a weight and a bias parameter of the content popularity deep learning prediction model after aggregation in the base station; $w_{r+1}^u$ and $b_{r+1}^u$ are a weight and a bias parameter of the local model obtained on the selected user terminal U after local training; $a_{r+1}^u$ and $q_{r+1}^u$ are weights, computed by formulas (III) and (IV), of the local model trained by the user terminal u.

6. The active edge caching method based on community discovery and weighted federated learning according to claim 4, wherein caching user selected in step (iv) uses the obtained content popularity deep learning prediction model to predict user preferences for different content at the next moment to cache hot content comprises:

(viii) in different user groups, inputting, by the caching users selected in step (4), locally recorded request data $d_{r-\rho:r}^u$ for different content in the previous p time windows into the trained content popularity deep learning prediction model, and outputting user preferences $\widehat{Y_{r+1}^f}$ for different content at the next moment; subsequently, computing caching probabilities of different content in the selected caching users according to predicted results, as shown in formula (VII):

$$p_{r+1}^f = \frac{\widehat{Y_{r+1}^f}}{\sum_{f=1}^{F} \widehat{Y_{r+1}^f}} \quad \text{(VII)}$$

wherein, $p_{r+1}^f$ represents a probability that content f is cached at the next moment, $\widehat{Y_{r+1}^f}$ represents a user preference for the content f at the next moment, and $$\sum_{f=1}^{F} Y_{r+1}^f$$

represents a sum of user preferences for all content; and (ix) sorting the caching probabilities by using a sorting algorithm, and selecting the first S pieces of content with the highest probability for caching at the selected user terminals.

7. The active edge caching method based on community discovery and weighted federated learning according to claim 1, wherein the content popularity deep learning prediction model is a bidirectional long short-term memory network model.

8. A computer device, comprising a memory and a processor, the memory storing a computer program, the processor implementing the steps of the active edge caching method based on community discovery and weighted federated learning according to claim 1 when executing the computer program.

9. A non-transitory computer-readable storage medium storing a computer program, the computer program, when executed by a processor, implementing the steps of the active edge caching method based on community discovery and weighted federated learning according to claim 1.

* * * * *